March 24, 1953     E. H. PAULSEN     2,632,457
LIQUID SAMPLING DEVICE
Filed May 24, 1947
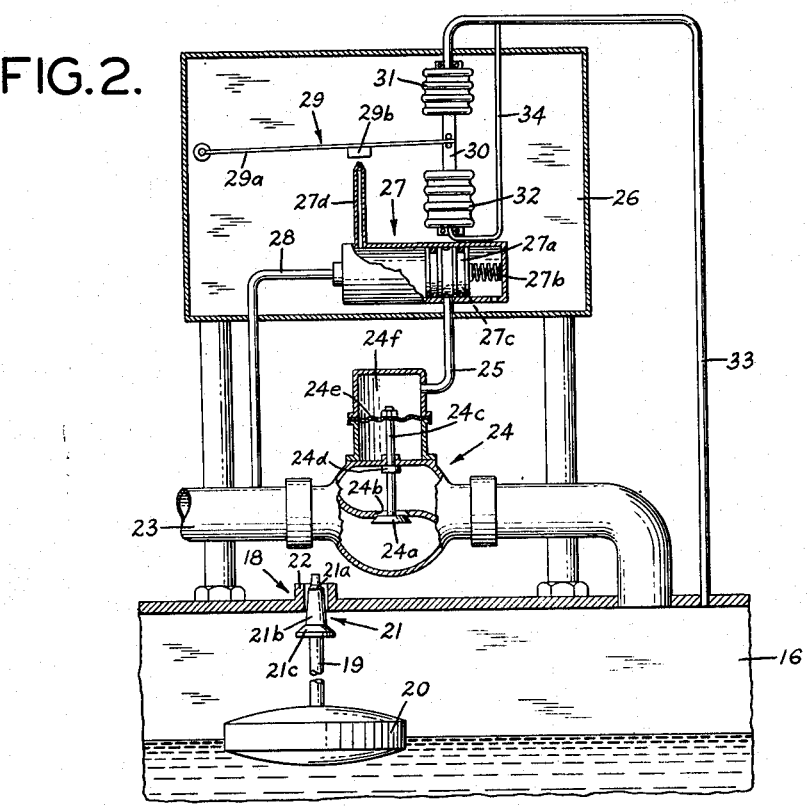
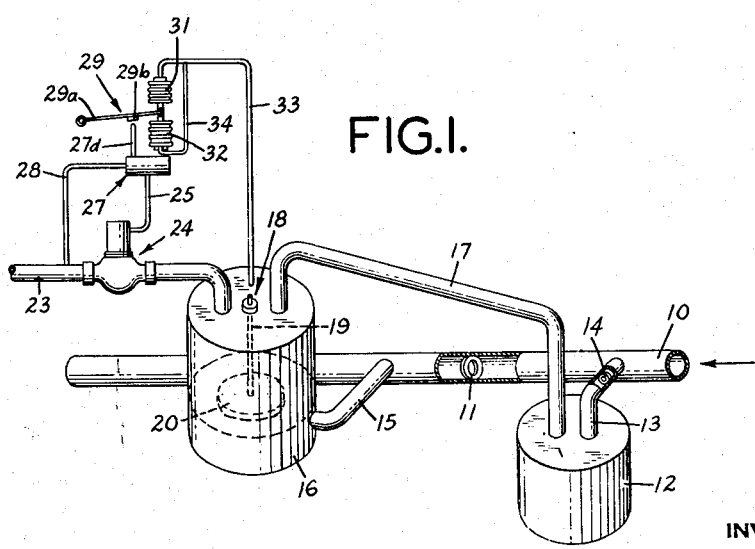
INVENTOR.
EDWARD H. PAULSEN
BY
HIS ATTORNEYS.

Patented Mar. 24, 1953

2,632,457

UNITED STATES PATENT OFFICE 2,632,457

LIQUID SAMPLING DEVICE

Edward H. Paulsen, White Plains, N. Y.

Application May 24, 1947, Serial No. 750,290

7 Claims. (Cl. 137—98)

This invention relates to improvements in proportional sampling and feeding devices and it relates particularly to an improved form of device for taking proportional samples of a liquid flowing through a conduit under all conditions of pressure and velocity.

This invention is an improvement over the feeding and sampling devices disclosed in my co-pending application Serial No. 552,450, filed September 2, 1944 now Patent No. 2,583,060, dated January 22, 1952.

The liquid sampling devices disclosed in my above-mentioned co-pending application are characterized by the provision of a sample receiver which is connected by a conduit or piping to a main conduit through which liquid is adapted to flow under hydrostatic pressure or under the pressure generated by a suitable pump. The conduit connecting the sample receiver to the flow conduit is provided with a restricted orifice, and the main flow conduit is also provided with a restricted orifice downstream of the conduit running to the sample receiver.

Downstream of the orifice in the flow conduit, is a take off or branch conduit which is connected to an air or pressure chamber that in turn is connected to the sample receiver by means of a conduit for transmitting air or gas pressure to the sample receiver.

The function of the above-described system is to maintain the pressures on the upstream sides of the orifices equal and also to render equal the pressures on the downstream sides of the orifices or, in other words, to equalize the pressure drops across the two orifices. When these conditions are maintained, the flow of liquid through the two orifices will be theoretically proportional to the areas of the orifices. For example, if the area of the orifice in the flow conduit is four square inches and the area of the orifice in the sample-taking conduit is 0.04 square inches, then for every 100 gallons per minute flowing through the flow conduit orifice, one gallon per minute will flow through the sample-receiving orifice, neglecting orifice coefficient and approach velocity.

The arrangement described above is not sufficient, however, to maintain the desired equality of the pressure drops across the orifices under all operating conditions, and therefore, as shown in Patent No. 2,583,060, a further equalizing system is provided in which air is introduced continuously into the air or pressure chamber, and the air pressure in that chamber is controlled to maintain a predetermined liquid level in the chamber preferably equal to the highest point of the sample-taking conduit or the center of the sample-taking orifice. The proportional feeding devices are based on the same principles of operation.

The air pressure system referred to above is entirely adequate for controlling the operation of the system so long as the pressure in the system remains substantially constant or variations in pressure take place slowly.

In a system of the type described above, the flow in the flow conduit is proportional to the square root of the pressure drop across the restricted orifice therein. The flow through the second orifice or the orifice in the branch conduit is proportional to the square root of the pressure drop across this orifice. Therefore, the flow through the second orifice is proportional to the flow in the flow conduit. Inasmuch as the flow in each case is solely a function of the pressure drop across the orifice, the flow is not affected by the pressure itself. The proportionality of flow is, however, affected by the level of the liquid in the pressure chamber and the level of the liquid flowing through the conduit into the sample chamber. For the most accurate results, the hydrostatic head in each case should be the same because it is found that variations in the hydrostatic head produce changes in the pressures at the downstream sides of the orifices and, as a consequence, the samples are rendered not exactly proportional.

The instant invention relates more particularly to an improved air control system whereby the inaccuracies introduced by sudden surges of pressure or flow in the main flow conduit are overcome.

More particularly, the present invention relates to a highly sensitive and quick-acting air control system applied to the air or pressure chamber whereby sudden surges in pressure may be reflected equally at the orifice in the sample taking conduit. So long as variation in level of the liquid in the air chamber can be avoided and the pressure drops across the orifices are maintained equal, the system is highly accurate in operation. The present invention provides such control and assures the accuracy of the sample-taking or feeding device.

More particularly, the applicant's pressure control system includes a float-controlled valve having a fairly short range of movement for controlling the escape of air from the air pressure chamber. This valve is responsive to the level of the liquid in the pressure chamber and upon increase in the level of the liquid in the chamber due to a sudden pressure surge, it will close and thereby prevent escape of the air being introduced into the chamber so that the air pressure in the air chamber and the sample taking chamber is increased. When a sudden increase in pressure in the air chamber occurs, a substantial elevation of the liquid in the chamber will also result unless some other means than the valve is provided to build up the pressure in the chamber fast enough to prevent the liquid from rising and partially submerging the float on the valve. During such time, the pressure in the chamber will not be equal to that in the main flow line and an error would occur in the sample flow. To offset this error, a second pressure controlled valve which is responsive to an increase in the pressure in the air chamber is provided which opens momentarily a control valve in the main air supply line to introduce a larger than normal volume of air into the chamber, thereby quickly retarding the rise of the liquid level in the air pressure chamber and bringing it back to its normal level. The ultimate effect of the pressure responsive valve is to maintain the liquid level within a narrow range and to reduce hunting in the system.

For a better understanding of the present invention, reference may be had to the accompanying drawing, in which:

Figure 1 illustrates a typical form of sample-taking device illustrated generally diagrammatically and with the air control system also shown diagrammatically thereon;

Figure 2 is a view in front elevation and partly in section of a portion of the air chamber and the control system applied thereto with parts broken away to disclose details thereof.

The form of sample-taking device chosen for purposes of illustration may include a main flow conduit 10 of any suitable size, which is provided with an orifice plate 11 providing a restriction for flow of liquid through the conduit 10.

A sample receiver 12 is connected to the conduit 10 by means of a branch conduit 13 which contains a small orifice plate 14 preferably of the type disclosed in my co-pending application Serial No. 750,289, filed May 24, 1947.

Downstream of the orifice plate 11 is a branch conduit 15 which is connected to the bottom of a closed air chamber 16. The air chamber 16 and the sample receiver 12 are connected by means of a conduit 17 communicating with their interiors through the tops of the air chamber and the receiver in order to equalize the pressures therein.

The air chamber is adapted to receive liquid from the flow conduit 10. The air chamber contains a float-controlled valve 18. The plug of the valve 18 is mounted on a stem 19 which extends upwardly from a hollow float member 20 that moves up and down as the level of the liquid changes. Referring now to Figure 2, the valve plug 21 of the valve 18 preferably is of a multiple tapered formation, including tapered shoulder 21a which merges into a less sharply tapered conical portion 21b, which in turn merges into a more sharply tapered conical portion 21c. The valve 21 cooperates with a ring-like valve seat 22 mounted in the top of the air chamber 16 so that the area of the space between the plug 21 and the seat 22 can be varied by raising and lowering the valve plug 21 in response to up and down movement of the float 20. When the valve plug portion 21c engages the lower edge of the ring 22, the valve is completely closed. The area of the space between the plug and the seat increases as the float moves downwardly.

Air is introduced into the chamber 16 through a conduit 23 which is provided with a diaphragm type valve 24. The valve 24 may be provided with a poppet type valve plug 24a which cooperates with a complementary valve seat 24b. The valve stem 24c is provided with a shoulder 24d which prevents complete closing or seating of the plug 24a so that air flows constantly through the valve into the chamber 16. The upper end of the valve stem 24c is connected to a diaphragm 24e mounted in an air chamber 24f fixed to the valve casing or to any other type of device that expands in response to an increase of air pressure therein. When air is introduced into the chamber 24f through the conduit 25, the valve 24 is opened in order to introduce air more quickly into the chamber 16. When the air pressure in the chamber 24f is relieved, the flow of air into the chamber 16 is decreased to a minimum.

The change in rate of flow of air provided by the valve 24 is utilized to overcome or neutralize sudden surges or changes in pressure in the liquid flowing through the flow conduit 10. Actuation of the valve 24 to neutralize these pressure surges is accomplished by the construction described hereinafter.

Mounted in a casing or on a panel 26, supported on top of the air chamber 16, or in any other convenient location is a shuttle type valve 27 having a piston 27a therein which operates to permit flow of air into the conduit 25 upon displacement to the right against the action of the spring 27b or to vent the air from the chamber 24f by means of a suitable port 27c through the piston 27a and a vent in the casing of the valve 27.

The casing of the valve 27 is connected by means of a conduit 28 to the air supply conduit 23, so that air under pressure acts against the piston 27a, tending to displace it to the right. The valve 27 is, however, provided with a nozzle 27d which vents enough air from the valve 27 to prevent the piston 27 from being displaced sufficiently far to the right to expose the conduit 25 so long as the nozzle 27d is open.

The nozzle 27d can, however, be closed by means of a flap valve member 29 including a pivotally mounted arm 29a having a pad or valve member 29b thereon movable into engagement with the end of the nozzle 27d to prevent escape of air therefrom. The free end of the lever 29a is connected to a shaft or rod 30 which mechanically interconnects a pair of expansible bellows members 31 and 32 in opposition. The bellows member 31 is connected by means of a conduit 33 to the air chamber 16, and the bellows member 32 is connected by a very fine or capillary tube 34 to the conduit 33. The action of the tube 34 is to cause the pressure in the bellows 32 to increase or decrease more slowly than the pressure in the bellows 31. As a result, a sudden increase in pressure in the chamber 16 will cause the bellows 31 to expand and, because of the rigid connection provided by the rod 30, cause the bellows 32 to contract, thereby shifting the rod 30 out of its neutral or initial position. Continued application of pressure to the bellows will, however, cause the pressure in the bellows to become equal and the rod 30 will be restored to its initial position, thereby moving the flap valve 29 out of contact with the nozzle 27d.

Assume now that the sampling device is operating normally, and air is being introduced continuously through the conduit 23 and the partially opened valve 24 into the air chamber 16, and air is escaping through the valve 18 at an equal rate because the liquid level in the air chamber is at its optimum position.

If a sudden surge in pressure should occur in the flow line, that increase in pressure will be reflected by a sudden rise in the level of the liquid in the air chamber 16. The increase in level will, of course, raise the float 20 and the valve plug 21, reducing the effective open area of the valve 18 so that the air can escape less freely. At the same time, the sudden increase in pressure will expand the bellows 31, since the pressure is transmitted to that bellows through the conduit 33. The increase in pressure expands the bellows 31 and compresses the bellows 32, thereby rocking the flap valve 29 downwardly and closing the nozzle 27d. The air pressure in the conduit 23 then quickly displaces the piston 27a to the right, uncovering the conduit 25 and supplying air to the air chamber 24f. The increased pressure in the chamber 24f displaces the diaphragm and opens the valve 24 farther, with the result that air under pressure is introduced into the air chamber 16 in increased volume. This sudden increase in air pressure forces the liquid in the air chamber 16 back toward its desired level and allows the float-controlled valve 18 to open farther to discharge air so that equilibrium is quickly reached.

The closing of the nozzle 27d usually is only momentary for the air will flow through the capillary tube 34 into the bellows 32 and will equalize the pressures in the bellows 31 and 32 in a short time. When this condition is attained, the flap valve 29 is displaced to the position shown, and air can again escape from the valve 27 through the nozzle 27d. The piston 27a then will be displaced by the spring 27b to vent the air from the air chamber 24f in the valve 24, thereby reducing the amount of air supplied to the air chamber 16. All of these operations take place very quickly so that the level of the liquid in the air chamber actually varies only very little when a sudden pressure surge occurs, and this slight variation is not sufficient to affect appreciably the accuracy of the sample being taken. It will be understood, of course, that the above discussion of the pressures in the air chamber 16 also applies to the pressures in the sample receiver 12 for the reason that these two chambers are connected by the conduit 17 and their pressures remain equal at all times.

The operation of the above-described system accomplishes the following results. If a sudden pressure surge, such as a sudden back pressure develops in the flow line, the level of the liquid in the chamber 16 would tend to rise but this pressure is not reflected equally in the flow line 10 at the zone of the branch conduit. The sudden rise of the liquid level will close or partially close the valve 21 because of the float 20 thereon. This action would tend to prevent the escape of liquid through the valve seat 22 and the air pressure in the chamber 16, as well as in the sample taking chamber 12 will begin to rise. However, the liquid level may overshoot the float so that the float is submerged farther than its normal submergence. As a consequence, the pressure in the chamber may rise to actually a higher value than the pressure needed to offset the level increase of the liquid and, as a consequence, the level of the liquid may be forced down below its initial level before air can escape sufficiently from the chamber to bring back the necessary equalization of pressures. The valves 27 and 29 overcome this tendency of the pressure to fluctuate back and forth as a result of a pressure surge by actuating the valve 27 promptly in response to a pressure increase in the chamber 16 thereby admitting air into the valve chamber 24f and opening the valve 24 farther so that an increased volume of air is admitted into the chamber 16 upon a sudden increase of the pressure therein. The increased volume of air promptly offsets the sudden rise in liquid level so that it cannot partially submerge the float 20, thereby smoothing out the operation of the system and preventing fluctuations in the pressure within the air chamber and the sample chamber above and below the pressure required to equalize or offset the change in liquid level produced by the surge in pressure. In this way, the pressures at the downstream sides of the orifices are maintained equal and, as a consequence, the flows through the orifices remain essentially proportional.

From the preceding description, it will be apparent that I have provided a sample-taking device which maintains its accuracy despite sudden or slow changes in pressure or velocity of flow of the liquid and that accurate samples are obtained at all times.

It will be understood that the construction and arrangement of the various elements may be changed without departing from the invention. For example, the diaphragm-controlled valve may be placed in a separate air supply conduit and may be fully closed instead of partially open except when pressure surges occur in the liquid. Moreover, a similar pressure-control system may be used for feeding liquids proportionally. Therefore, the form of the invention described above should be considered as illustrative of the invention and not as limiting the scope of the following claims.

I claim:

1. A liquid sampling device comprising a flow conduit having a restricted orifice therein, a sample receiver connected to said conduit upstream of said restricted orifice, a chamber connected to said flow conduit downstream of said orifice for receiving liquid from said conduit to rise to a level in said chamber, in part determined by the pressure of the liquid in said conduit, another restricted orifice between said flow conduit and said sample receiver, means for introducing air under pressure into said chamber and receiver to equalize the pressures therein, means responsive to pressure for supplying air at an increased rate to said chamber and receiver, a liquid-level controlled valve for regulating the escape of air from said chamber to maintain the liquid in the chamber at about a predetermined level, and additional means responsive to sudden rise in the level of the liquid in said chamber for supplying air under pressure to said pressure-responsive means to supply air at an increased rate to said chamber and receiver to restore said liquid to said predetermined level.

2. A device for maintaining equal pressure drops across a pair of orifices through which liquid is flowing from a source common to both orifices; comprising a first chamber communicating with the downstream side of one of said orifices and adapted to receive liquid flowing through it to rise in said chamber to a level in part determined by the pressure of the liquid flowing from said source, a second chamber communicating with the down stream side of the other orifice, a conduit for introducing air under pressure into said chambers, a float-controlled valve in said first chamber for discharging air therefrom, an air control valve in said conduit movable between partially open and more fully opened positions to regulate the flow of air into said chambers, a pair of expansible bellows communicating with said first chamber through passages of different size, for causing said bellows to expand at unequal rates in response to an increase in pressure in said chambers, means connecting said bellows mechanically in opposition to cause one bellows to contract as the other expands, said connecting means being movable out of an initial position during unequal expansion of said bellows and being restored to said initial position when the pressures therein are equalized, an expansible member connected to said air control valve for moving the latter to more fully opened position in response to air pressure supplied thereto, and another valve connected to said conduit and actuated by said connecting means for supplying air under pressure to said expansible member when said connecting means is out of said initial position, and discharging gas from said expansible member when said connecting means is in said initial position.

3. A device for maintaining equal pressure drops across a pair of orifices through which liquid is flowing from a source common to both orifices; comprising a first chamber communicating with the downstream side of one of said orifices and adapted to receive liquid flowing through to rise to a level in said chamber in part determined by the pressure of the liquid at the down stream side of said one of said orifices, a second chamber communicating with the down stream side of the other orifice, a conduit for introducing air under pressure into said chambers to equalize the pressures therein, a liquid-level controlled valve for discharging air from said first chamber, an air control valve in said conduit movable between partially open and more fully opened positions to regulate the flow of air into said chamber, a pair of expansible bellows communicating with said first chamber through passages of different size, for causing said bellows to expand at unequal rates in response to an increase in pressure in said first chamber, means connecting said bellows mechanically in opposition to cause one bellows to contract as the other expands, said connecting means being movable out of an initial position during unequal expansion of said bellows and being restored to said initial position when the pressures in the bellows are equalized, and means responsive to movement of said connecting means for opening said air control valve more fully when said connecting means is out of said initial position and for restoring said valve to partially open position when said connecting means is in said initial position.

4. A liquid proportioning device comprising a liquid flow conduit having a restricted orifice therein, a receiver for liquid connected to said flow conduit on one side of said orifice, a chamber connected to said flow conduit on the opposite side of said orifice from said receiver for receiving liquid from said flow conduit to rise to a level in said chamber in part determined by the pressure in the flow conduit, a second restricted orifice between said receiver and said flow conduit, means for introducing gas under pressure into said chamber, pressure-responsive means for varying the rate at which gas is introduced into said chamber, a valve responsive to the level of the liquid in said chamber for regulating the escape of gas from said chamber to maintain the liquid in said chamber at about a predetermined level, means connecting said chamber and said receiver to maintain equal gas pressures therein, and means responsive to sudden increase in the liquid level in said chamber for actuating said pressure-responsive means to supply gas at an increased rate to said chamber to restore the liquid therein to said predetermined level.

5. A liquid sampling device comprising a flow conduit having a restricted orifice therein, a sample receiver connected to said conduit upstream of said orifice, a chamber for receiving liquid from said conduit connected to the latter downstream of said orifice, said liquid rising in said chamber to a level in part determined by the pressure of the liquid in said conduit, another restricted orifice between said flow conduit and said sample receiver, a conduit for introducing air under pressure into said chamber and said receiver to equalize the pressure therein and normally tending to force said liquid out of said chamber, a liquid-level controlled valve in said chamber for regulating escape of air from said chamber to maintain the liquid therein at about a predetermined level, an air control valve in said air introducing conduit for regulating the supply of air to said chamber, means including an expansible chamber for actuating said air control valve to control the rate at which air is supplied to said chamber, and means responsive to a sudden increase in the level of said liquid in said chamber for supplying air under pressure to said expansible chamber at an increased rate to actuate said air control valve to supply air to said chamber to restore the liquid therein to said predetermined level.

6. In a device for maintaining equal the pressure drops across a pair of restricted orifices in a flow conduit and a branch conduit communicating with said flow conduit; the combination of a first chamber connected to one of said conduits downstream of the orifice therein and adapted to receive liquid flowing through one of said orifices to rise to a level in said chamber in part determined by the pressure in said conduit, a second chamber connected to the other conduit downstream of the orifice therein, a gas supply conduit connecting said chambers with a source of gas under pressure to equalize the pressures therein, a liquid-level controlled valve in said first chamber for releasing gas from said first chamber to maintain the liquid therein at substantially a predetermined level, a gas control valve in said conduit for regulating the introduction of gas into said chambers, said gas control valve being normally partially open and movable to a more fully opened position to allow gas to flow into said chambers continuously, a gas-receiving chamber having a wall movable in response to variation in the pressure of the gas therein, means connecting said wall to said gas control valve to move the latter between partially open and more fully opened positions; another valve connected between said gas supply conduit and said gas-receiving chamber for supplying gas to and venting gas from the latter, and means including an expansible member connected to said first chamber for actuating said another valve to supply gas to said gas-receiving chamber and to open said gas control valve more fully upon a sudden increase in the level of the liquid in said first chamber.

7. In a device for maintaining equal the pressure drops across a pair of restricted orifices in separate conduits connected to a common source of liquid; the combination of a pressure chamber connected to one of said conduits downstream of the orifice therein and adapted to receive liquid flowing through the last-mentioned orifice to rise in said chamber to a level in part determined by the pressure of the liquid in said flow conduit, another chamber connected to the other conduit downstream of the orifice therein, a gas supply conduit to connect said chambers with a source of gas under pressure to equalize the pressures therein, a float-controlled valve in said pressure chamber for releasing gas from said pressure chamber to maintain the liquid therein at substantially a predetermined level, a gas control valve in said conduit for regulating the introduction of gas into said chambers, said gas control valve being normally partially open and movable to a more fully opened position to allow gas to flow into said chambers continuously, a gas-receiving chamber having a wall movable in response to variation in the pressure of the gas in said pressure chamber, means connecting said wall to said gas control valve to move the latter between partially open and more fully opened positions; another valve connected between said gas supplying conduit and said gas-receiving chamber for supplying gas to and venting gas from the latter, and means including a pair of expansible members mechanically connected in opposition to each other and connected to said pressure chamber by passages of different size to cause them to expand at different rates for actuating said another valve to supply gas to said gas-receiving chamber and open said gas control valve more fully upon a sudden increase in the level of the liquid in said pressure chamber.

EDWARD H. PAULSEN.

REFERENCES CITED

The following references are of record in the file of this patent:

UNITED STATES PATENTS

| Number | Name | Date |
| --- | --- | --- |
| 1,842,153 | Duden | Jan. 19, 1932 |